June 13, 1967  H. E. STAPH ET AL  3,324,708
BEARING TEST ASSEMBLY WITH ROTARY CAGE FOLLOWER
Filed Nov. 19, 1964  7 Sheets-Sheet 2
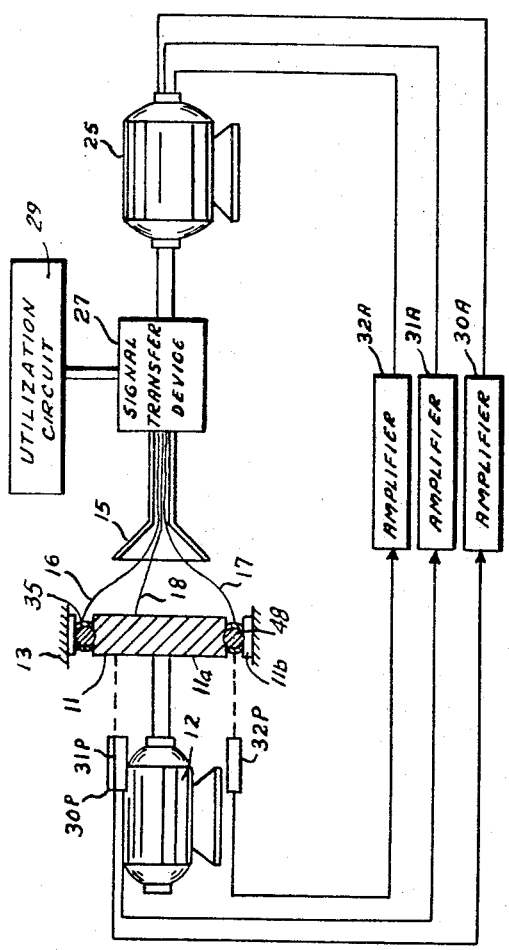
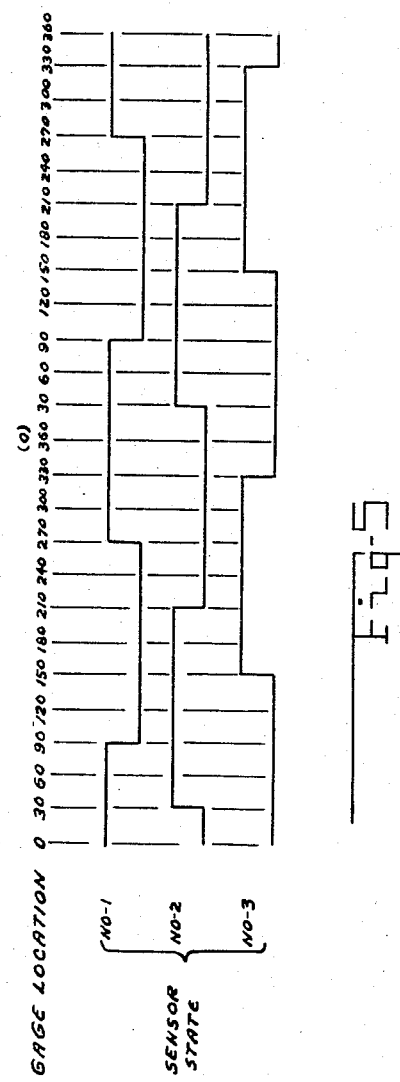
INVENTOR
HORACE E. STAPH
WALTER A. GUNKEL
GEORGE F. MUNSCH
BY Harry A. Herbert Jr.
ATTORNEY
Richard J. Killoren
AGENT

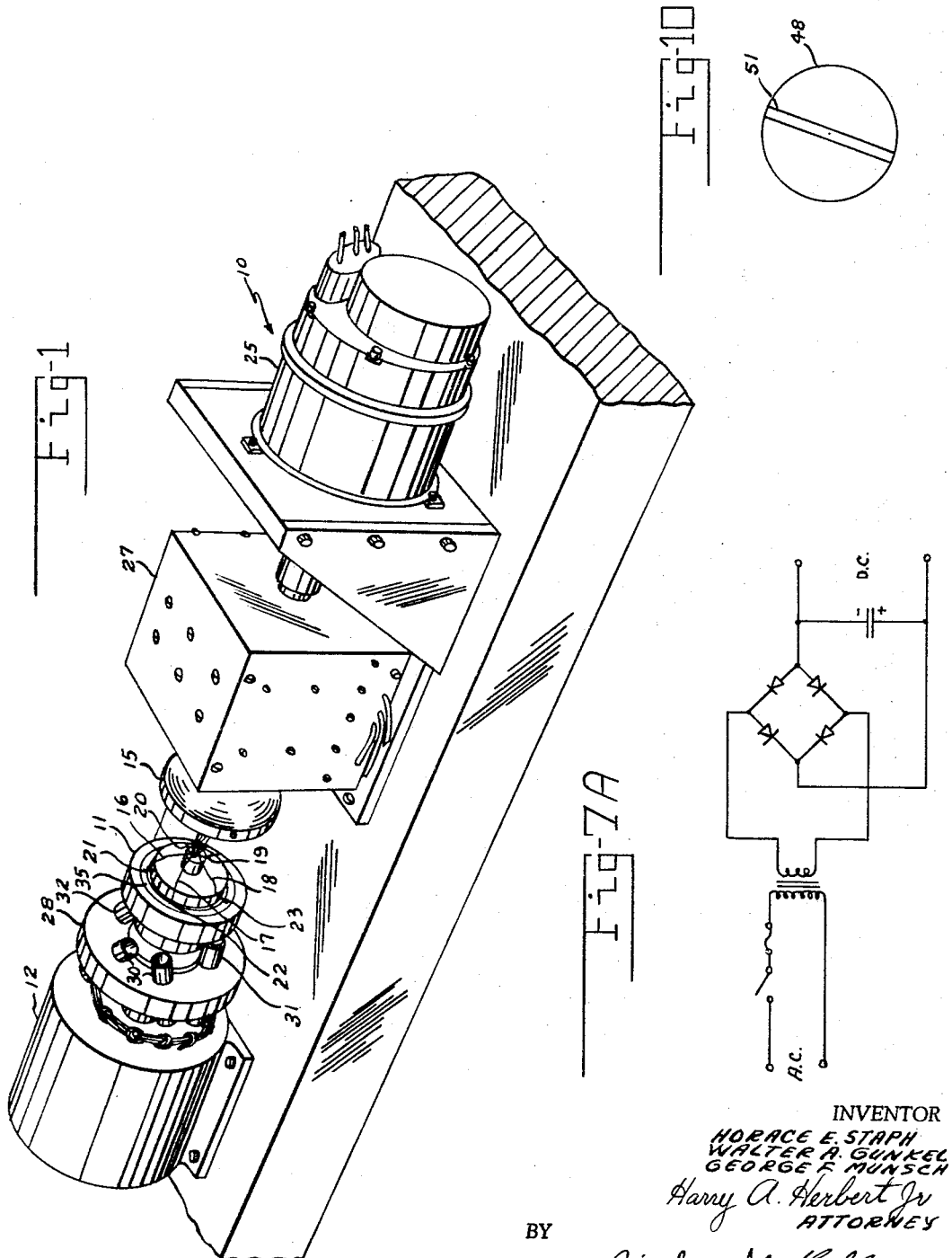

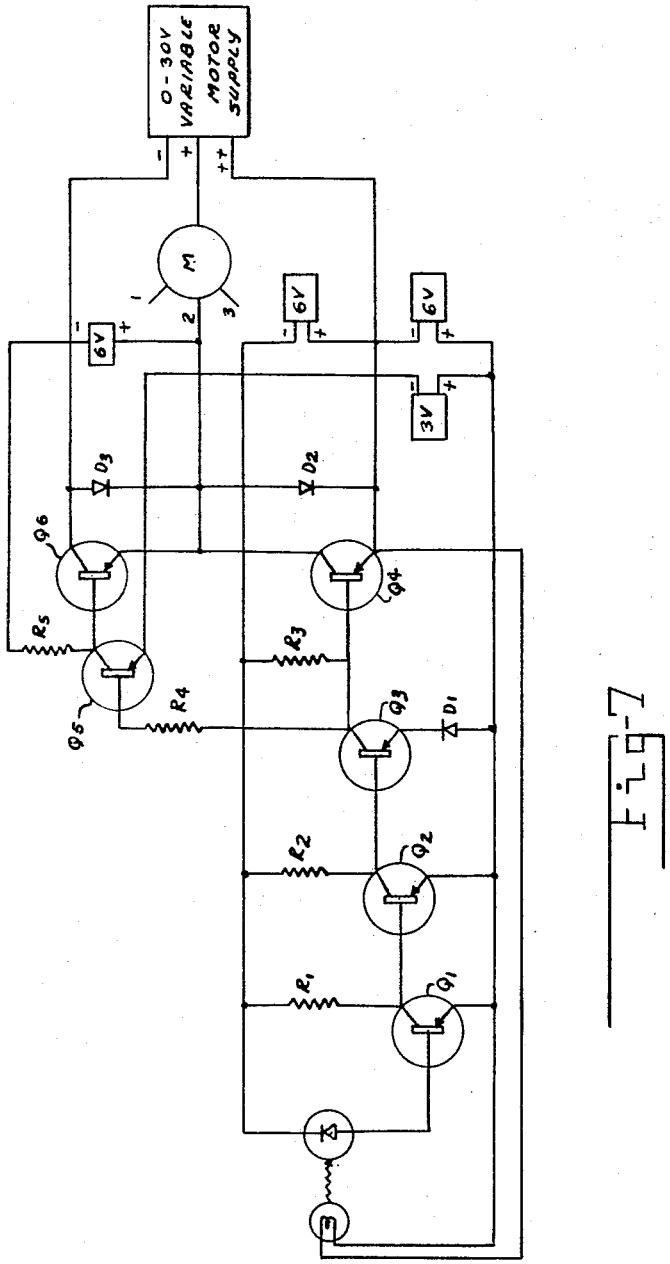

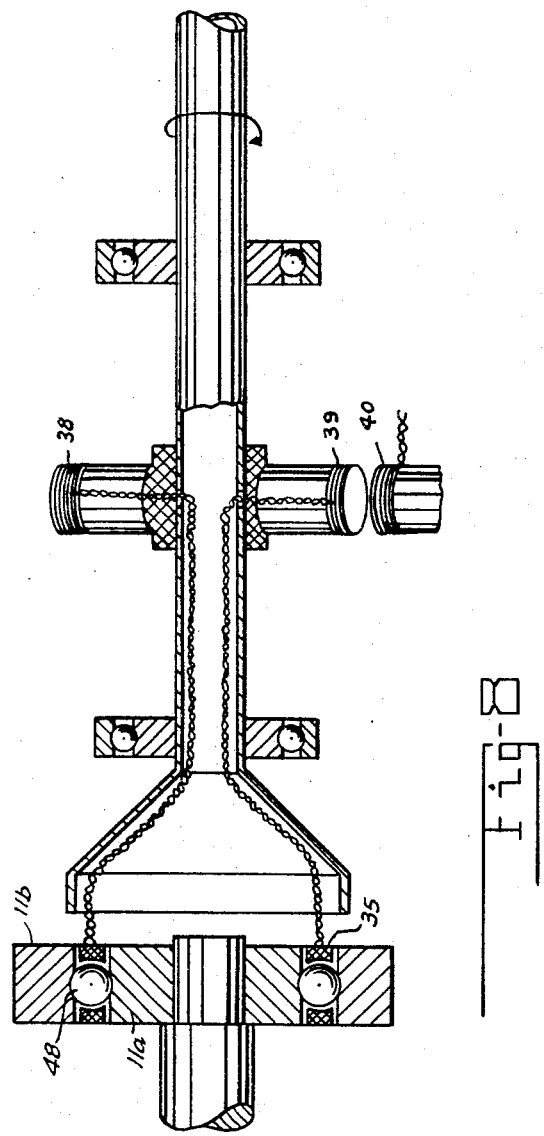

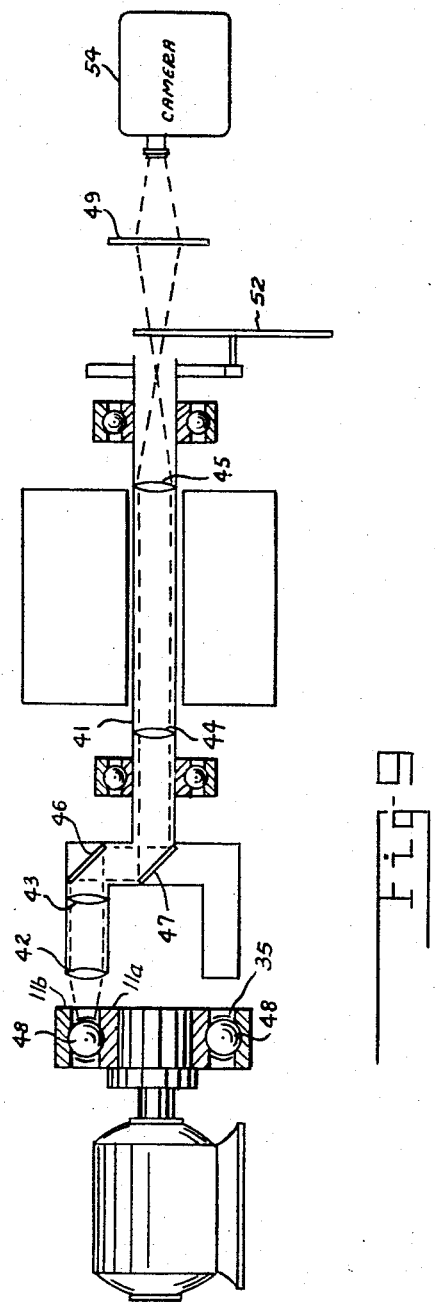

United States Patent Office 3,324,708
Patented June 13, 1967

3,324,708
BEARING TEST ASSEMBLY WITH
ROTARY CAGE FOLLOWER
Horace E. Staph, Walter A. Gunkel, and George F.
Munsch, San Antonio, Tex., assignors to the United
States of America as represented by the Secretary of
the Air Force
Filed Nov. 19, 1964, Ser. No. 412,574
3 Claims. (Cl. 73—9)

This invention relates to a system for providing rotary platform, that supports sensors connected to the cage of a cage-type bearing under test, which is made to rotate substantially in synchronism with the bearing cage.

One object of the invention is to provide a system for obtaining test data of actual bearing behavior under normal operating conditions.

Another object of the invention is to provide a system for testing bearing behavior without imposing mechanical stress on the bearing.

A further object of the invention is to provide a system for substantially synchronizing the rotation of a cage follower with the rotation of the bearing cage of a bearing under test.

These and other objects will be more fully understood from the following detailed description taken with the drawing, wherein:

FIG. 1 is a perspective view of the bearing test assembly of the invention with the test bearing outer race clamp removed;

FIG. 2 is a schematic diagram partially in section of the device of FIG. 1;

FIG. 5 shows the waveforms for the output signals of the photocells of the device of FIG. 3;

FIG. 7 is a circuit schematic of one of the amplifier circuits of the device of FIGS. 1 and 2;

FIG. 7A is a circuit schematic of the power supplies used in the device of FIG. 7;

FIG. 8 is a schematic diagram of a signal transfer device for the device of FIG. 1 for use with D.C. signals;

FIG. 9 is a modification of the device of FIG. 1 with an optical transfer system; and FIG. 10 shows one of the balls of the ball bearing under test with a reference band.

Figure 3:
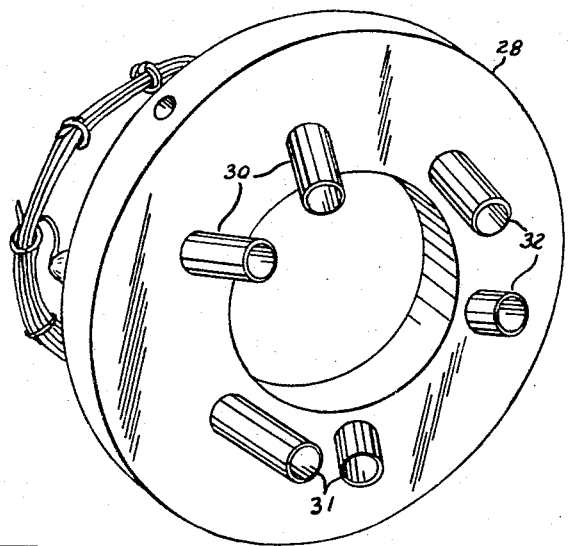
FIG. 3 is a perspective view of the cage position sensor of the device of FIG. 1.

In order to evaluate rolling-element bearing operation and to determine wear and friction mechanisms, it is necessary to make measurements in the vicinity of the rolling elements themselves and on the bearing cage.

According to this invention a system was devised for obtaining signals directly from an operating high-temperature bearing and for transmitting the signals from the moving parts without the addition of mechanical contacts which would alter the behavior of the bearing and thus void any measurements thus obtained. This is accomplished by providing a rotary platform or cage follower which is made to rotate substantially in synchronism with the bearing cage, so that connections may be made to sensors mounted on the bearing cage and permitting leads to be brought away from the bearing without imposing mechanical stress on the bearing. Since the bearing cage does not run at the same speed as the bearing drive a cage speed sensor is provided to determine the rotational speed of the bearing cage and to control the rotational speed of the platform. Various means may be provided to transfer the signals from the rotating system to stationary indicating and recording devices, for example telemetering. Optical means, which is substantially synchronized with the rotation of the bearing cage, may also be provided to permit optical analysis of the bearing.

Referring now to FIG. 1 of the drawing, reference number 10 shows a test assembly having a cage type ball bearing 11 having an inner race 11a that is driven by a bearing drive motor 12. The bearing 11 also has an outer race 11b, ball bearing elements 48 between the inner and outer races, and a cage or retainer 35 which separates the ball bearing elements and keeps them properly spaced about the periphery of the unit. The outer race clamp for bearing 11 is omitted for clarity, however in actual tests, as shown schematically at 13 in FIG. 2, a clamp would be provided for the outer race. Any well known clamp device could be used.

A rotary cage follower 15 is provided adjacent the bearing 11 to support leads 16, 17, 18, 19 and 20. These leads are respectively connected to sensors 21, 22, 23 and two sensors not shown attached to the bearing cage. The sensors produce electrical signals proportional to predetermined operating characteristics of the bearings, such as temperature. The cage follower is driven by a synchronous motor 25 through a signal transfer device 27. The output of the signal transfer device is connected to a utilization device 29. A cage position sensor 28 controls the synchronous motor 25 to maintain substantial synchronism between the cage 35 of test bearing 11 and the cage follower 15.

To provide a synchronized platform it is necessary to determine the instantaneous location of the bearing cage as it is carried in the ball orbit, amplify the signals produced by the cage location sensors, and to apply these signals to the synchronous motor to control the position of the platform.

Figure 4:
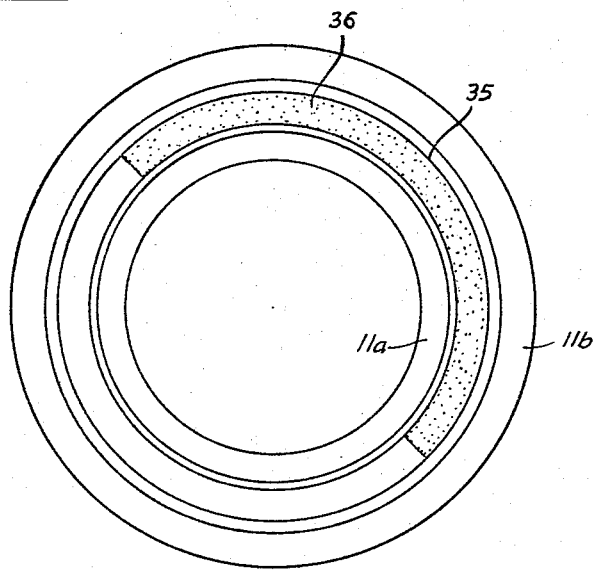
FIG. 4 is a front plan view of a bearing prepared for test, in the test assembly of the invention.
Figure 6A:
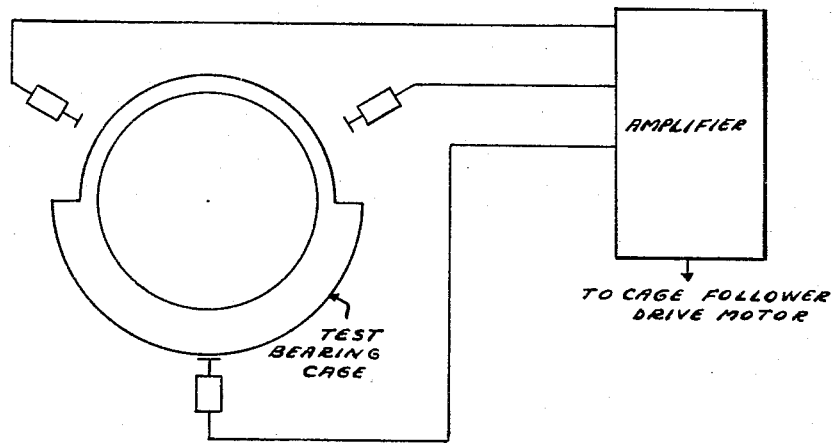
FIG. 6A is a schematic diagram of another embodiment of the cage position sensor of FIG. 3.
Figure 6B:
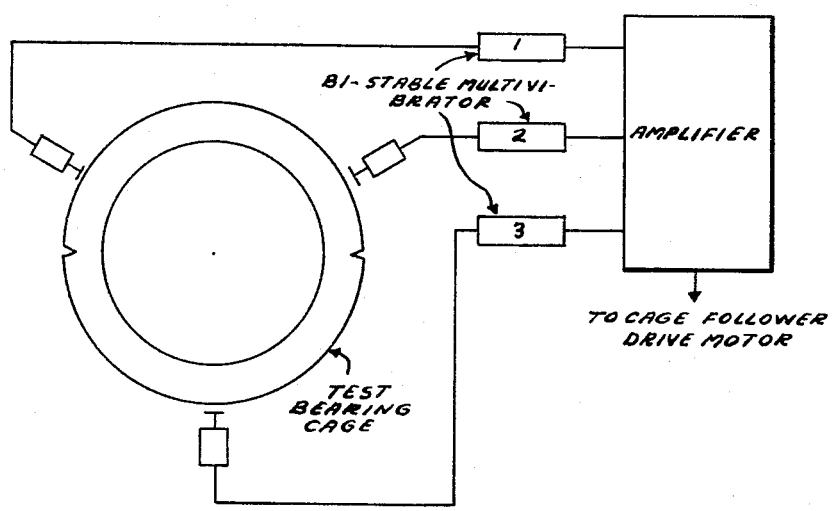
FIG. 6B is a schematic diagram of a modification of the cage position sensor of FIG. 6A.

The sensor consists of three light-source photocell combinations 30, 31 and 32 spaced 120° apart around the bearing cage, as shown in FIG. 3. The bearing is prepared for test in the manner shown in FIG. 4. The bearing cage 35 has an aluminized Mylar reflector 36, or some other suitable reflecting surface material, coated on one half of its exposed surface. This then produces signals in the output of the photocells 30p, 31p and 32p as shown in FIG. 5. As can be seen, one of the sensors reverses its signal every 60°, so that if the follower is positioned intermediately between switching points the platform is never misaligned by more than 30°. The electrical leads from the sensors on the test bearing can stand this amount of misalignment. Electrostatic electromagnetic proximity detectors such as shown in FIGS. 6A and 6B may be provided if desired, however these would require a greater modification of the test bearing cage.

The output of the photocells are applied to the synchronous motor through amplifiers 30A, 31A and 32A as shown in FIG. 2. To simplify the drawing the light sources have been omitted from this figure.

The three photocell signal amplifiers 30A, 31A and 32A each consist of a three stage transistor preamplifier driving a phase inverter and a push-pull output stage as shown in FIG. 7. Since the three amplifiers are the same only one will be described, with respect to FIG. 7. The preamplifier design is a straight-forward D.C. coupled system, but the output stage is unconventional in that it supplies a D.C. voltage which reverses polarity with respect to the common lead. With no illumination falling on the photocell, the first stage $Q_1$ is off (nonconducting). $Q_2$ is held on by base current through $R_1$ and draws current, causing a voltage drop across $R_2$ which is great enough to bias the base of $Q_3$ to cut off. The diode $D_1$ in the emitter of $Q_3$ acts as a constant voltage drop slightly greater than the drop across $Q_2$ when it is conducting so that the base of $Q_3$ can be held cut off. With $Q_3$ cut off, there is little voltage drop across $R_3$, forward biasing $Q_4$, and through $R_4$, $Q_5$. $Q_5$ draws current through $R_5$, reverse biasing $Q_6$, so that $Q_4$ is on and $Q_6$ is off and positive voltage is applied to one winding of the stator from the motor variable power supply. When the cage is repositioned so that light falls on the sensitive area of the photocell, it conducts, biasing $Q_1$ on, which turns $Q_2$ off, and in turn $Q_3$ on; $Q_4$ and $Q_5$ are turned off, leaving $Q_6$ on. These condtions apply negative voltage from the variable supply to the motor. In the scehmatic circuit, power sources are shown as boxes. They each consist of a transformer, bridge-rectifier and filter, as shown in FIG. 7A, each tailored for the voltage and current required. The resistors $R_1$ to $R_5$ are chosen so that each stage is either fully cut off, or in saturation, depending on the input condition. This follows standard switching system design philosophy and develops the least power dissipation. Diodes $D_2$ and $D_3$ suppress voltage spikes caused by an inductive kick from the motor winding during switching by clamping the stator voltage to the supply voltage, thereby protecting the collector junction of the power transistors $Q_4$ and $Q_6$.

The synchronous motor used is a three phase motor with a two pole permanent magnet rotor.

The signal transfer device may incorporate various methods for transferring the signal information to stationary instruments or utilization devices such as meters or recorders. One such system is radio telemetry wherein small transistorized radio-frequency transmitters are located within the cage follower for sequentially telemetering the measured parameters to a radio receiver located near the bearing test equipment. Other methods could be by the use of rotary transformers for use with A.C. signal which consist of two concentric windings wherein the inner winding is attached to the rotating equipment and the outside winding is attached to the stationary equipment.

A system for transferring D.C. signals such as produced in thermocouples is shown in FIG. 8. Here the direct current flowing through the rotor pole windings 38 and 39 creates a magnetic field proportional to the current and the number of turns. A voltage is produced in the stator 40 which is proportional to current and speed. A calibration chart may be produced by measuring the current through the pole winding for various temperatures with the system at rest and by producing equal currents in the windings with a battery and taking readings at various speeds. However, other systems which separate the output voltage due to current amplitude and that dependent on the speed of the rotating cage follower may also be used.

The device of FIG. 9 shows an optical system for observing the bearing under test in operation. The synchronizing system is the same as in the device of FIGS. 1 and 2 and therefore is not shown in this figure. The synchronous motor however is provided with a hollow shaft 41. A lens system 42, 43, 44 and 45 together with a pair of mirrors 46 and 47 provide an image of the bearing cage and one of the balls 48 on the screen 49. A reference band 51, as shown in FIG. 10, may be provided on the balls to help identify the balls' relative positions. A stroboscope or a mechanical chopper such as shown at 52 may be desired to obtain periodic images of the ball on the screen 49. A high speed camera 54 may also be provided to obtain a photograph of the ball and bearing cage. To obtain a good image of the ball a portion of the bearing cage may be cut away.

There is thus provided a system for providing a platform, for holding test equipment, adjacent a bearing under test which is substantially synchronized to the rotational speed of the bearing cage.

While certain specific embodiments have been described it is obvious that numerous changes may be made without departing from the general principles and scope of the invention.

I claim:

1. A device for obtaining test data of bearing behavior under normal operating conditions from a cage type bearing under test having means for driving said bearing at substantially normal predetermined operating conditions; comprising: a bearing cage follower; means, supported on said cage follower for obtaining information relating to certain predetermined operating characteristics of said test bearing; means for driving said cage follower in the direction of rotation of said bearing; means for sensing the rotational speed of the cage of said bearing; means responsive to said speed sensing means, for controlling the rotation of said cage follower driving means to substantially synchronize the rotation of said cage follower to the rotational speed of said bearing cage.

2. A device for obtaining test data of bearing behavior under normal operating conditions from a cage type test bearing having an inner race, an outer race, bearing roller elements between said inner race and said outer race, and a cage for separating the bearing roller elements, with means for rotating the inner race of said bearing at a predetermined speed; comprising: a bearing cage follower; means, connected to the cage of said bearing, for producing electrical signal proportional to certain predetermined operating characteristics of said bearing cage; a signal utilization device adjacent said test device; means, supported on said cage follower and connected to electrical signal producing means, for transferring signal information proportional to said operating characteristics to said utilization device; means for driving said cage follower in the direction of rotation of said bearing; means for giving different portions of the cage of said bearing different reflective characteristics; means for directing a plurality of beams of light toward the cage of said bearing; a photocell adjacent each of said light directing means for receiving light from the cage of said bearing; means, responsive to the output of said photocells, for controlling said cage follower driving means to substantially synchronize the rotation of said cage follower to the rotational speed of said bearing cage.

3. A device for obtaining test data of bearing behavior under normal operating conditions from a cage type test bearing having an inner race, an outer race, bearing roller elements between said inner race and said outer race, and a cage for separating the bearing roller elements, with means for rotating the inner race of said bearing at a predeterimned speed; comprising a bearing cage follower; means, connected to the cage of said bearing, for producing electrical signal proportional to certain predetermined operating characteristics of said bearing cage; a signal utilization device adjacent said test device; means, supported on said cage follower and connected to electrical signal producing means, for transferring signal information proportional to said operating characteristics to said utilization device; a three phase synchronous motor connected to said cage follower; a reflective coating on one half of the surface of the cage of said bearing; means for directing three beams of light toward the cage of said bearing; a photocell adjacent each of said light directing means for receiving reflected light from the cage of said bearing; means for controlling the output of said photocells to the three phase inputs of said synchronous motor to substantially synchronize the rotation of said cage follower to the rotational speed of said bearing cage.

References Cited

UNITED STATES PATENTS

| | | | |
|---|---|---|---|
| 2,262,361 | 11/1941 | Gulliksen | 318—313 |
| 2,961,875 | 11/1960 | Reumund | 73—351 |
| 3,174,341 | 3/1965 | Sudo et al. | 73—351 |
| 3,194,051 | 7/1965 | Schnoll | 73—9 |

DAVID SCHONBERG, *Primary Examiner.*